May 23, 1933.    C. M. SEMLER    1,910,128
APPARATUS FOR TREATING RUBBER TIRES
Filed Jan. 26, 1931    2 Sheets-Sheet 1
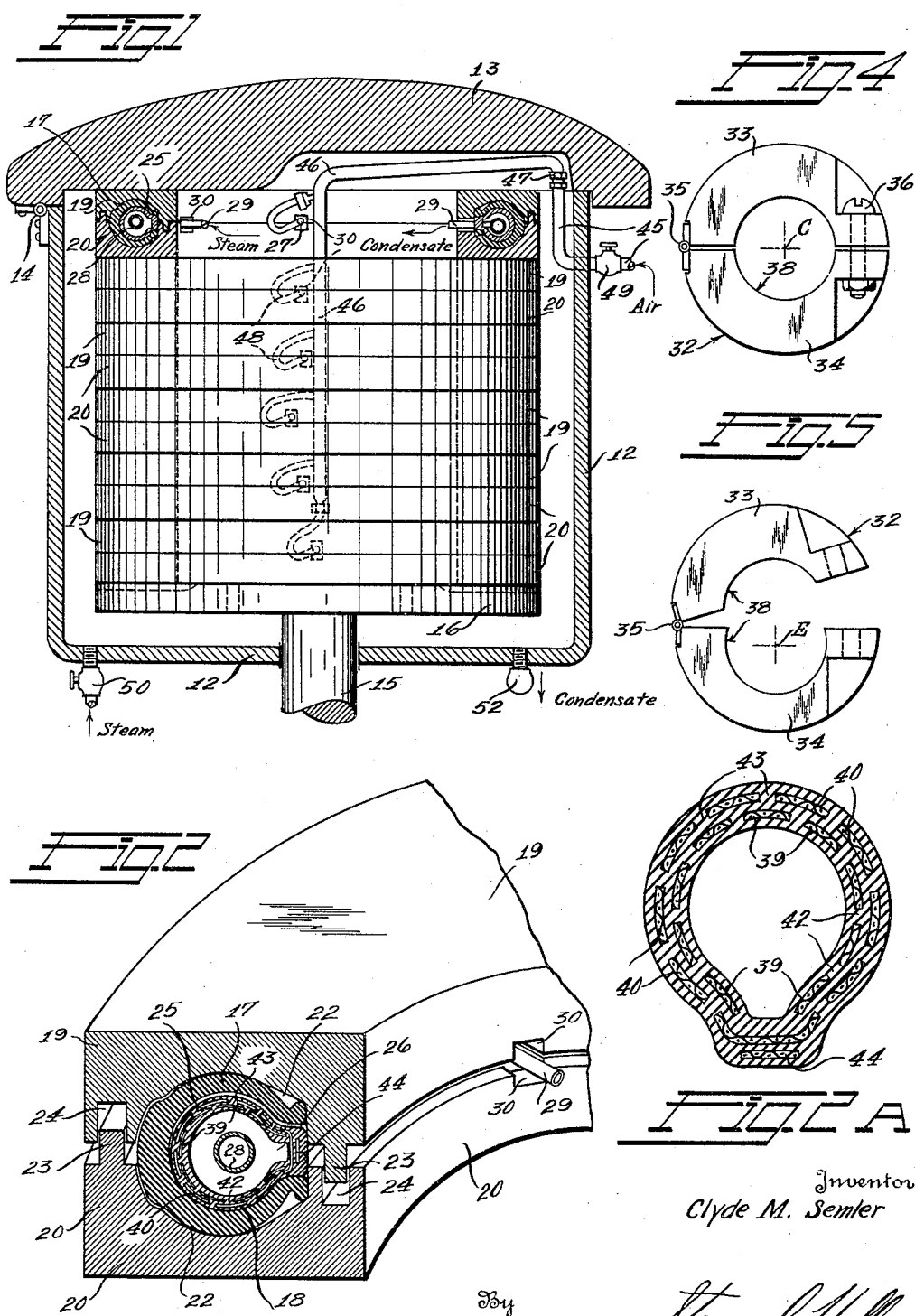
Inventor
Clyde M. Semler May 23, 1933.  C. M. SEMLER  1,910,128
APPARATUS FOR TREATING RUBBER TIRES
Filed Jan. 26, 1931  2 Sheets-Sheet 2
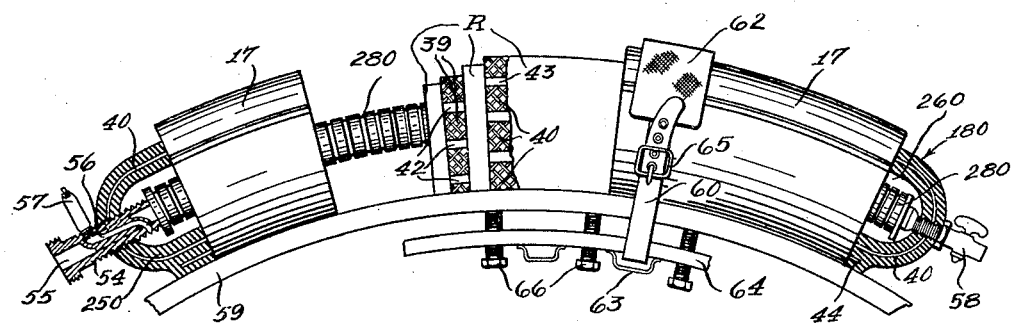
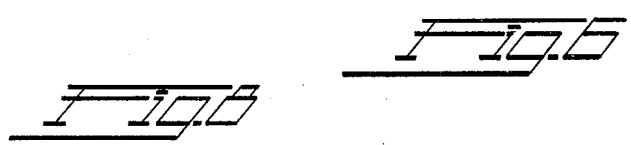
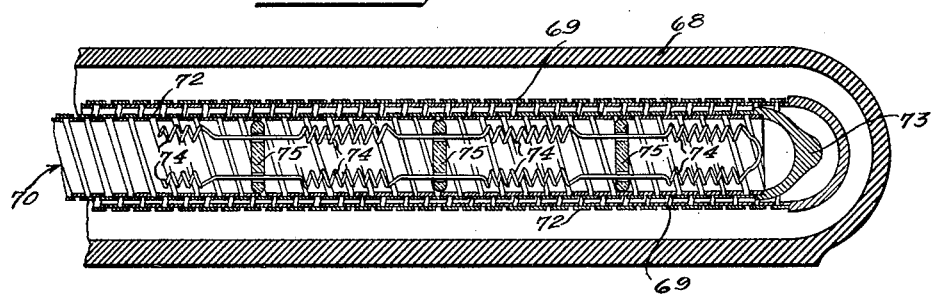
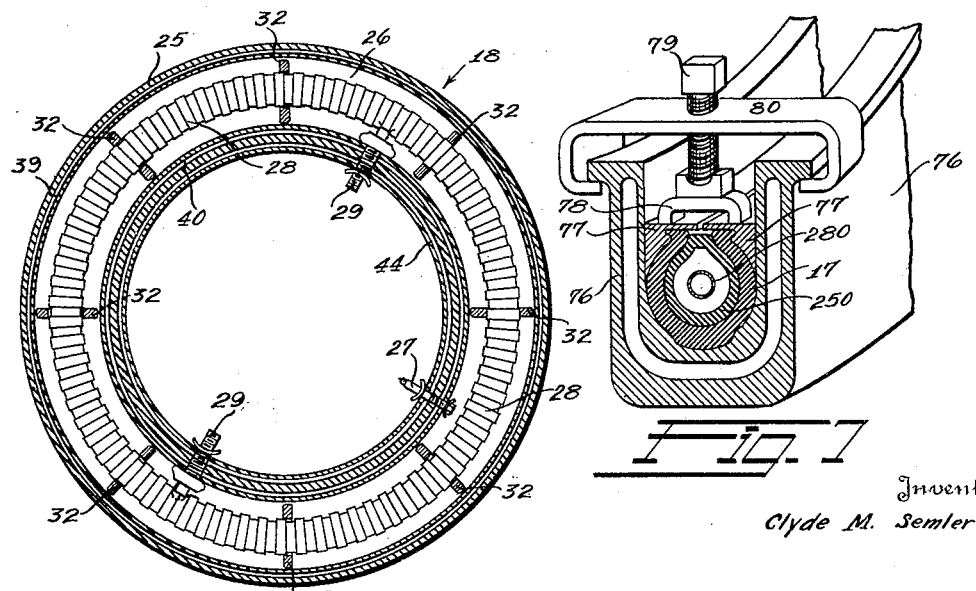
Inventor
Clyde M. Semler
By Strauch & Hoffman
Attorneys Patented May 23, 1933

1,910,128

UNITED STATES PATENT OFFICE

CLYDE M. SEMLER, OF CUYAHOGA FALLS, OHIO

APPARATUS FOR TREATING RUBBER TIRES

Application filed January 26, 1931. Serial No. 511,370.

This invention relates to methods and apparatus for treating rubber tires. More specifically, it is concerned with improvements in curing the rubber of new tires and in repairing old tires.

The objects of and problems solved by the invention about to be described can best be shown by a brief discussion of some of the defects and disadvantages of the methods and apparatus heretofore known and used in the art and industry.

One of the early methods of tire repairing consisted in applying a heated mold upon the outside of the tire and pressing a sand bag into position within the tire casing adjacent the mold. It was impossible to force the sand bag into uniform engagement with the inside surface of the tire and hence the pressure was unevenly distributed. As a result, one had to make several cures to complete the repair job, and the successive applications of heat by way of the mold overcured the rubber on the outside of the tire. This greatly reduced the life of the tire, since the overcured rubber would be deteriorated and worn away much faster than the rest of the tire.

The above old method was later improved by substituting an air bag for the sand bag and, by using air at high pressure, the bag could force the tire into much more uniform engagement with the mold. However, due to the impracticability of introducing a proper heat into the bag in a convenient and inexpensive manner, the heat from the outside (from the mold) had to be relied upon for effecting the cure. An attempt was made to introduce inside heat by injecting steam into the air bag but, since the pressure must be high to obtain uniform curing and since steam above 60 pounds pressure has a burning temperature, this method of internal heat application had to be abandoned. As a result, only external heat could be applied and in order to sufficiently cure the inner rubber the outer rubber or tread was overcured. Moreover, such equipment is so costly that the average repair shop carries only several sizes of molds to cure tires of approximately forty different sizes, and hence it follows that many tires are ruined by repairing them in molds which do not fit them.

Another, and probably a later method, consists in using a steel arm in lieu of a sand or air bag and in substituting muslin wraps for the outer mold. The steel arm is inserted in the casing adjacent the spot to be repaired and the muslin wrapped around the outside of the tire and tightened. This represents an improvement over some of the other old methods in that the heat is applied to the inside of the tire, whereby curing time is decreased and chances for overcuring lessened. But it has serious disadvantages, chief among which are that the arm cannot be made to fit perfectly within the inside of the tire, and hence a non-uniform curing results; and that the initial cost is excessive, since an individual arm is necessary for each size of tire. A similar method employing steel mandrels is also used in curing new tires and is open to the same objections.

The steel mandrel cure for new tires was given up as a bad idea. Attempts were made to use air bags instead, but this resulted either in overcuring of the outside of the tire or undercuring of the inside of the tire, or both, because of the impracticability of known methods for heating the air bags. Experiments were then made on using a shorter cure gum on the inside of the tire, and some factories are using such a process today. Other factories have gone to a hot water curing method wherein water, instead of air, is supplied to the bag. The water is hot and under pressure to supply the necessary temperature and pressure. This process entails great expense in equipment and operation.

Accordingly, it is the primary object of my invention to devise improved methods and apparatus for curing and repairing tires, in which some or all of the necessary and desirable features of previous methods are retained, and in which all of the prior defects and disadvantages (pointed out above), are eliminated. By my improved method, the expense of equipment is greatly reduced and, without sacrificing uniformity of cure, both the inside and the outside rubber of the tire is given the same proper cure. Other major objects, subordinate to the primary one just stated, are as follows:

It is an object of the present invention to provide an air bag constructed in a practicable manner so that not only may high air pressures be used to obtain uniform curing along the periphery and walls of the tire but also a sufficient internal application of heat may be made to cure the inside of the tire and thus obtain uniform curing throughout the cross sectional area of the tire. In connection with the foregoing object it is a further object to obtain the proper internal temperatures by heating the compressed fluid in the air bag by means of a flexible heating element arranged within the tube and spaced from the walls thereof. It is highly important that the heating element be made flexible, since it is thus adapted for convenient insertion and withdrawal, and the life of the air bag is materially increased.

Another object of this invention resides in the provision of an air bag that is expansible diametrically and hence adapted for use in a number of tires of different sizes within a certain range, and which is so constructed that any cracks in the rubber are stopped before they can enlarge from one surface to the other. The bag, when used in the manufacture of new tires, preferably is of endless formation. The heating element may be removable and may be either of the full length of the bag or made up in one or more shorter sections for insertion in the bag.

A further object of my invention consists in heating an air bag by means of an internally arranged flexible steam tube. Another specific object of this nature is to provide a flexible electric heating unit for use in an air bag. Where steam is utilized it is a further object to incorporate novel and effective drainage features for the removal of condensate.

Insofar as the present invention is concerned with the repairing of rubber tires, another object of invention consists in providing a new and improved means and method for obtaining an outside application of heat that is localized at the point of repair and, in so doing, to complete the job in such manner that the final diameter of the tire through the repaired spot is exactly equal to all other diameters of the tire.

The above and further subordinate objects will be fully understood after reference to a later detailed description of several embodiments of the invention.

A further major object, and one that is somewhat independent of those outlined above, lies in new and improved methods for curing new tires in a steam kettle. One particular form is illustrated and several alternative methods will be described later in connection with the illustration. While most of the preceding objects are concerned both with the manufacture of new tires and with the repair of used tires, this particular object deals solely with the curing of new tires.

Other objects of the present invention will appear in the following detailed description and appended claims, when studied in conjunction with the accompanying drawings, wherein:

Figure 1 represents a vertical section taken centrally of a steam kettle for curing new tires, with one embodiment of my invention incorporated therein.

Figure 2 shows, in enlarged perspective, a portion of one of the tire and mold assemblies seen in Figure 1, prior to its insertion in the kettle.

Figure 2A is an enlarged cross section of the air bag of Fig. 2.

Figure 3 is a sectional view, taken horizontally through the circular axis of the endless form of air bag shown in Figs. 1 and 2.

Figure 4 is an enlarged side elevational view of one of the devices for supporting the heating tube within the air bag in Figure 3.

Figure 5 is a detail view, similar to Figure 4, showing another of the supporting devices, with an eccentric central opening for the purpose of inclining the heating tube.

Figure 6 is a view, partly in section and partly in side elevation, of a preferred embodiment of my invention as adapted to the repair of used tires. In this form, the air bag of Figures 1-3 has been modified and a special method of external heat application is illustrated.

Figure 7 shows, in sectioned perspective, the air bag of Figure 6 being used on a repair job in association with a well known type of repair mold.

Figure 8 shows another modified form of air bag, wherein the heating element comprises an electrical unit in lieu of a steam tube.

With continued reference to the drawings, wherein like numerals are employed to designate like parts, and with particular reference to Figures 1-5:

Numeral 12 indicates a cylindrical, cup-shaped curing kettle having a lid 13 hinged thereto as at 14 and a latching means (not shown) of any suitable type for holding it in closed position. A hydraulic piston 15 projects upwardly through the bottom of the kettle and supports a circular pressing table 16. The kettle arrangement is somewhat diagrammatically illustrated, and is conventional except for certain added improvements now to be described.

A plurality of new tires 17 are adapted to be placed upon the table in superposed relationship for the purpose of curing the rubber of which they are made. As best seen in Figs. 2 and 3, each tire has a heated air bag 18 arranged in the form of an inner tube therein and is clamped between the complemental units 19 and 20 of an individual steel mold. Each of the units 19 and 20 is in the form of an annular block having a seat 22 shaped to conform to a portion of the tire's outer surface and has an aligning tongue 23 and an aligning groove 24 for mating cooperation with corresponding elements 24 and 23 respectively on the other block after the tire, together with its air bag 18, has been positioned within the mold.

Still referring to Figs. 2 and 3, each air bag 18 preferably comprises a relatively heavy, endless, rubber tube 25 within which is sealed an air space 26. An air valve 27, which may be of the conventional Shrader check valve type, is mounted in the inner wall of the tube with its stem projecting away therefrom. Through this valve the space 26 may be filled with air under high pressure, such for example, as 200 pounds per square inch, for the purpose of expanding the bag to force its outer walls into firm heat exchanging contact with the inner walls of the tire. This pressure also serves to force the outer walls of the tire into effective contact with the seats 22 of the mold. These relationships are illustrated in Fig. 1, wherein the molds have been stacked up and the hydraulic table 16 is forcing them against each other and the closed lid 13, of the kettle, but are not illustrated in Fig. 2 since the assembly of Fig. 2 has not yet been placed in the kettle.

For the purpose of heating the air in the bag, a flexible steam tube 28 is mounted within the bag, this tube having a pair of normally open connections 29 through which steam may be circulated and any condensate removed. These connections communicate directly with the steam tube and they, as well as the latter are sealed against the escape of steam, so that the air and steam are kept separated, with the former heated by the latter. The hot air, of course, transfers heat from the steam to the inner layers of rubber of the tire to cure the latter. The advantage of this arrangement is that low pressure steam (e. g. 60 pounds pressure) can be circulated within the tube 28 and yet, by utilization of the surrounding air space 26, the necessary pressures can be maintained within the air bag. If steam alone were used by circulating it in the air space, it could not be given the requisite pressure without its reaching a burning temperature. The flexibility of the metal tube 28 is a very important feature, since it permits the air bag to be distorted in shape and inserted without great difficulty in the tire casing being cured. The flexible tube may be formed of material other than metal.

The adjoining inner portions of the mold blocks 19 and 20 are provided with complemental transverse passageways 30 forming openings through which the steam connections 29 and the air valve 27 may project toward the radial center of the mold assembly. Air and steam may be conveniently applied to the ends of these devices in a manner yet to be described. The flexible steam tube 28 is held in spaced relationship with the walls of the air bag by a plurality of rings 32 in the form of doughnuts and made of rubber or any suitable material (see Figs. 4 and 5). Each ring is split to form an upper section 33 and a lower section 34, hinged together at one side as at 35 and adapted to have their opposite sides drawn together by a screw bolt assembly 36. The holes 38 of the rings are designed to receive the tube when the sections are clamped around the latter by tightening the screws, and the rims of the ring are adapted to fit freely within the air bag. Some of the holes 38 have concentric centers C, as shown in Fig. 4, while others have holes arranged in various positions of eccentricity as illustrated by center E in Fig. 5. This is for the purpose of supporting the tube 28 at a slight inclination to the horizontal for drainage purposes. One of the connections 29 enters the tube at its lowermost point, as seen at the right side of Fig. 1, to remove condensate therefrom, and the other connection 29 permits access of steam at a high point diametrically opposite the low point.

The wall or tube 25 of the air bag is specially constructed to have long life and to have an unusual expansion so that, if desired, one bag may be used in tires of several different sizes within a limited range. The wall 25 is formed of rubber containing several radially spaced layers of fabric. As illustrated in Fig. 2A, there are two layers, 39 and 40 respectively. The inner layer 39 has a number of spaced slits 42 running lengthwise of the bag, and the outer layer 40 has a number of corresponding slits 43. The slits 42 and 43 are staggered so that each slit 42 is directly adjacent (inwardly of) an uncut portion of the fabric layer 40 and each slit 43 is directly adjacent (outwardly of) an uncut portion of the fabric layer 39. This construction will be better understood by reference to the central portion of the air bag 180 of the modification of Fig. 6 wherein the air bag wall is precisely the same as that of Figs. 2 and 2A and wherein a portion of each ply of the bag is seen in elevation. The rubber R of the wall is shown, and the two fabric layers 39 and 40 with their staggered cut-outs 42 and 43 respectively.

As a result of the wall formation just described, it will be observed that the slitted fabric permits the bag to expand within the tire in substantially as free a manner as would an all rubber bag. The purpose of staggering the slits is to prevent any fissures or cracks originating in an inner (or outer) layer of rubber from growing and extending through the full thickness of the wall. A fissure starting from the inner rubber of the wall, for example, can extend through one of the slits 42 of the fabric 39 but it is then stopped as it reaches the adjacent fabric 40. As seen in Fig. 2, the fabric 40 is wrapped all the way around the tube and a narrow reenforcing strip 44 is used adjacent the butt or inner circle of the bag. It should be understood that embodiment described is only illustrative, and that other constructions may be used to provide an expansible, non-cracking bag, and that the less expansive conventional bags may be used if desired.

In operation, the several molds, assembled as in Fig. 2, are placed upon the table 16 in the steam kettle. A fixed air supply pipe 45 projects into the kettle. A flexible air line 46 is coupled, as at 47, with the pipe 45. This line is swung down into the cylindrical space formed by the stacked molds, and each one of a set of branch lines 48 is detachably connected to an adjacent one of the air valves 27 that projects into the cylindrical space. The kettle lid 13 is then closed and locked, and the hydraulic piston is raised to force the molds into fully clamped positions upon the tires. A valve 49 in the air line is then opened and the air bags are inflated to, for example, 200 pounds pressure. At the same time a steam valve 50, connected into a wall of the kettle, is opened to flood the interior of the kettle with steam at a pressure of, for example, 60 pounds. This steam heats the molds and cures the outside rubber of the tires, and at the same time enters the connections 29 to heat the air bags and thus cure the inner rubber of the tires. Any condensate formed within the steam tubes of the air bags is eliminated through some of the connections 29, and the condensate may be removed from the kettle by an automatic drain valve 52. The above described process will cure the tires in about one half the time previously required, uniformly and without burning.

The above method may be modified in a number of ways, as to circulating the steam through the tubes of the air bags. With the arrangement otherwise the same as illustrated in Fig. 1, one of the connections 29 of each air bag may be connected in communication with a line that discharges at the outside of the kettle, thus insuring positive steam circulation through the air bags and positive removal of condensate. Another method consists in, (with the arrangement otherwise the same as illustrated) connecting a steam line directly with one of the connections 29 of each air bag instead of relying upon the steam within the kettle finding its way into, and circulating through, the air bags. This is a preferred method. The two variations just discussed may be readily made by bringing the auxiliary steam line, (discharge or inlet as the case may be) into the kettle in much the same manner as the air line is inserted.

Most of the forms and principles already described and discussed are equally adaptable to the repair of used tires. In Fig. 6, there is illustrated a preferred apparatus and method for tire repair jobs.

With continued reference to Fig. 6, numeral 180 designates an air bag that is constructed exactly like the bag 18 of Fig. 3 except that it is not endless like the latter and it has other types of air and steam connections than those of Fig. 3. This bag 180 is made up in the form of a tube 250 of any desired length and having its ends closed. A flexible steam tube 280 is arranged within the tube 250. One of its ends is connected with a steam fitting 54 that is screwed through and sealed within the corresponding end of the air bag. The fitting 54 is designed to form a steam passage 55 that communicates with the flexible tube 280 and an air passage 56 that communicates with the air space 260 of the bag. A check valve 57 is screwed into the passage 56 to provide means for filling the space 260 with air under pressure. A valve assembly 58 is inserted through the opposite end of the bag and placed in communication with the corresponding end of the steam tube to permit steam circulation to be caused and condensate to be drained away. In actual practice the apparatus of Fig. 6 will not be set up as illustrated but rather in a position to ensure drainage through the cock 58. Any well known or obvious equivalent may be substituted for the latter.

The air bag 180 is shown disposed within a tire 17 that is mounted upon a rim 59. The tire is strapped or otherwise secured upon the whole or a section of the rim. One of the straps, 60, is of special design, carrying a flexible electric spotter in the form of an electrically heated pad 62 that is designed to be placed over the hole or cut portion of the tire that is being repaired. The strap passes from one end of the spotter, around the rim by way of the guiding eye 63 of a pressure application bar 64, and thence is adjustably connected to the other end of the spotter by a buckle 65. The bar 64 is adjustable toward and from the rim by means of screw clamps 66 which are threaded through the bar into contact with the rim.

With the parts arranged as shown in Fig. 6, air is forced into the bag through the valve 57 and the spotter 62 drawn against the damaged portion of the tire by the use of the pressure bar clamps alternately until a micrometer shows that the tire section to be cured is of exactly the same cross section as all other portions of the tire. This feature is of importance since a repaired portion that forms an enlargement or depression on the tire tread will soon be beaten out when the tire is used on the road. The localization of the external heat by use of a small spotter instead of a large mold is also important, since in this way only the rubber added for the repair is cured; i. e., there is no burning of the rubber that was originally cured to the proper degree during the manufacture of the new tire. The spotter of course need not be used where the damage to be repaired is confined to the inner rubber and fabric of the tire.

The air bag having been properly inflated and the spotter properly applied, the electricity is switched on and the steam is admitted into the flexible tube 280 for a period of time sufficient to obtain a full and uniform cure at the repaired section of the tire. The air bag may be made up in any and various lengths for use in repairing various cuts and bruises of different sizes. For the small repair job illustrated the bag need be only a fraction of the length of that in Fig. 6.

The air bag of Figure 6 may be used in other types of repair apparatus. For example, I have shown it utilized in Fig. 7 in association with an old conventional type of heated mold assembly. The assembly comprises a mold proper, 76, for the reception of the tire and bag, a pair of pressure-application members 77, an equalizing pressure-distributor 78, and a screw clamp assembly 79, 80, for acting upon the distributor 78 to compress the tire within the mold. The mold provides the external application of heat, if any is necessary, and the air bag is operated in substantially the same manner as outlined in the discussion of Fig. 6.

In the methods and apparatus thus far described for curing new tires and repaired sections of used tires, the heating element may take other forms than that of a steam tube. For example, as illustrated in Figure 8, an electrical unit may be inserted in the air bag. The bag of Figure 8 is shown straight and somewhat diagrammatically, for convenience of illustration. It may be used for repair work and may be slightly modified for use in curing new tires.

The bag comprises a tube 68, formed of rubber and having a fabric ply as in the other figures if desired, within which is disposed a flexible metal tube 69. The latter corresponds to the tubes 28 and 280 of the other forms, and may be positioned within the bag by rings as in Figure 3. The tube 69 contains, instead of steam, an electrical heating unit 70 which may take any form so long as it is capable of insertion within the tube 69 and does not materially detract from the flexibility of the latter. For present purposes of illustration the electrical unit comprises a flexible sheathing 72 terminating at its end in a pilot cap 73 and containing an electrical resistance unit in the form of connected wire coils 74 that are positioned by a set of special insulating discs 75. The element 70 is made as an individual unit in order that it may be withdrawn from and inserted in, any one of a number of bags of different sizes. It may be used in lieu of steam, as by pushing it into the tubes 28 and 280 of Figures 3 and 6. The cost of equipment thus is minimized. Also, the average life of an air bag is less than that of heating unit and hence, when the former is worn out, the unit may be used in another bag. In some cases where the above considerations do not apply the outer tube 69 may be dispensed with.

The term "air bag" is employed frequently in the foregoing description and the appended claims. This term is used loosely in the art to define any bag or tube designed to apply vulcanizing pressure internally of a tire casing, whether the pressure fluid be air or some other suitable medium, and I wish it to be understood that the term is here used in the same broad and comprehensive sense. It should further be understood that the word "fluid" is generically used to define air, vapors, and other gases, water, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by U. S. Letters Patent is:—

1. An air bag for use in curing the rubber and fabric of tires, said bag comprising a tube having walls forming a pressure chamber space, and a freely flexible heating element disposed in said chamber within said tube in spaced relation to the said walls of the latter.

2. In the combination defined in claim 1, said heating element comprising a flexible tube or tubes sealed from the said fluid space and having means for receiving steam or the like.

3. In the combination of claim 1, said heating element comprising a flexible electrical unit projecting into said fluid space.

4. An air bag for use in treating the rubber of tire casings, said bag comprising walls forming an internal chamber, means for admitting fluid under pressure into said chamber, and an elongated flexibly sheathed electrical heating unit mounted in said chamber to heat the fluid therein and walls thereof.

5. In the combination set forth in claim 4, said electrical unit being designed for convenient insertion within, and withdrawal from, said chamber.

6. A device designed to fit within a rubber tire and to supply heat to the latter, said device comprising a full circle sealed bag forming a space for air, means for admitting compressed air to said space, and a flexible heating element arranged within the air space.

In testimony whereof I affix my signature.

CLYDE M. SEMLER.